United States Patent [19]

Gulsvig

[11] Patent Number: 5,395,518
[45] Date of Patent: Mar. 7, 1995

[54] HIGH PRESSURE FILTER WITH INTEGRAL RELIEF VALVE

[75] Inventor: Brent A. Gulsvig, Lakeville, Minn.

[73] Assignee: Donaldson Company, Inc., Minneapolis, Minn.

[21] Appl. No.: 115,304

[22] Filed: Aug. 31, 1993

[51] Int. Cl.⁶ .......................................... B01D 35/147
[52] U.S. Cl. .................................. 210/132; 210/429; 210/440; 210/DIG. 17
[58] Field of Search ............... 210/130, 132, 133, 137, 210/429–431, 440, 443, 444, DIG. 17

[56] References Cited

U.S. PATENT DOCUMENTS

| | | | |
|---|---|---|---|
| 3,297,162 | 1/1967 | Mouwen | 210/132 |
| 3,315,809 | 4/1967 | Hultgren | 210/130 |
| 3,529,722 | 9/1970 | Humbert, Jr. | 210/130 |
| 4,053,409 | 10/1977 | Kuhfuss, Jr. | 210/130 |
| 4,222,875 | 9/1980 | Sikula, Jr. | 210/235 |
| 4,364,825 | 12/1982 | Connor, Jr. | 210/109 |
| 4,369,113 | 1/1983 | Stifelman | 210/440 |
| 4,480,160 | 10/1984 | Stifelman | 200/82 R |
| 4,522,712 | 1/1985 | Fischer et al. | 210/86 |
| 4,615,800 | 10/1986 | Stifelman et al. | 210/132 |
| 4,743,374 | 5/1988 | Stifelman | 210/440 |
| 4,834,885 | 5/1989 | Misgen et al. | 210/440 |
| 4,853,118 | 8/1989 | Brownell et al. | 210/130 |
| 4,872,976 | 10/1989 | Cudaback | 210/130 |
| 4,883,083 | 11/1989 | Fisher et al. | 137/110 |
| 4,953,127 | 6/1990 | Lowsky et al. | 210/130 |
| 4,969,994 | 11/1990 | Misgen et al. | 210/232 |
| 4,990,247 | 2/1991 | Vandenberk | 210/130 |
| 5,037,539 | 8/1991 | Hutchins et al. | 210/133 |
| 5,104,537 | 4/1992 | Stifleman et al. | 210/440 |

FOREIGN PATENT DOCUMENTS 1237093  6/1971  United Kingdom ................ 210/130

*Primary Examiner*—Matthew O. Savage
*Attorney, Agent, or Firm*—Merchant, Gould, Smith, Edell, Welter & Schmidt

[57] ABSTRACT

A spin-on filter is shown for use in high pressure fluid applications. The filter generally includes a housing having an open end and a closed end. Disposed within the housing is a filter element having an open end and a closed end. A cover is placed in the open end of the housing, the cover having a entrance flow passage operable in delivering fluid to the filter and a exit flow passage operable in delivering fluid from the filter. The cover includes a hub sealingly engaged with the open end of the filter element. A valve assembly extends from the hub into the housing, and defines a valve seat with said hub. The valve seat has a relief channel therethrough, connecting the entrance flow passage to the exit flow passage. A baffle plate is adjacent to the valve seat and biased against the valve seat. In operation, the first and exit flow passages have associated pressures. If the pressure in the entrance flow passage exceeds the pressure in the exit flow passage by a predetermined amount, the baffle plate is displaced from the valve seat. A bypass filter is provided between said first and exit flow passages to filter fluid passing through the relief channel.

8 Claims, 2 Drawing Sheets

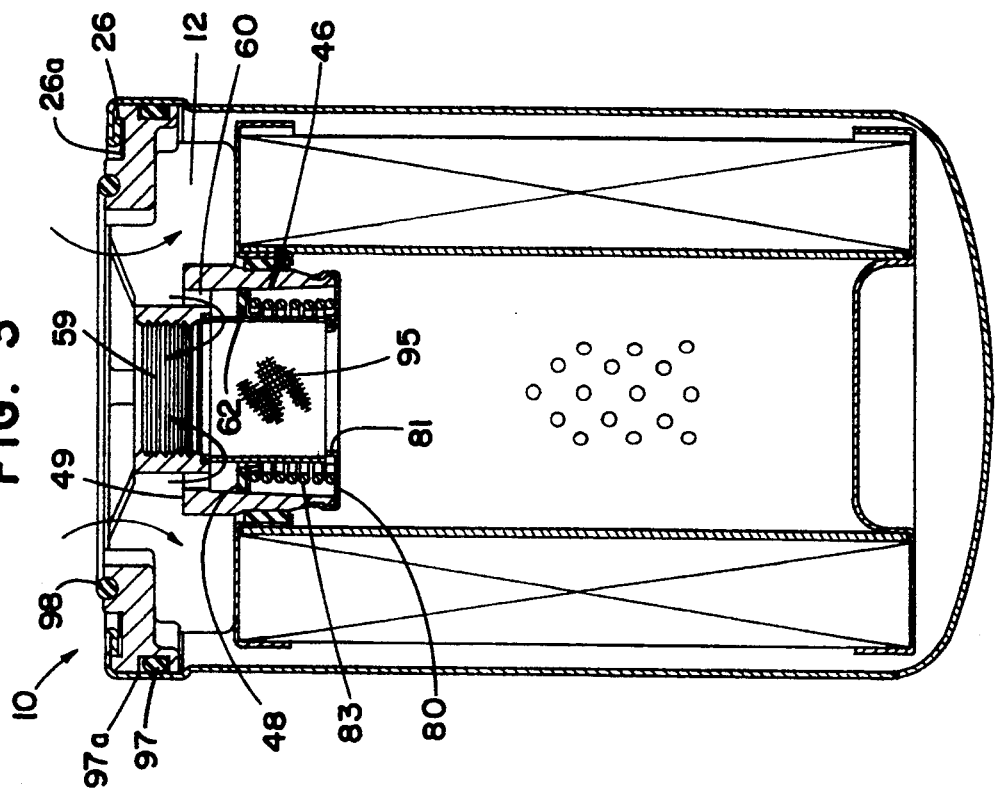
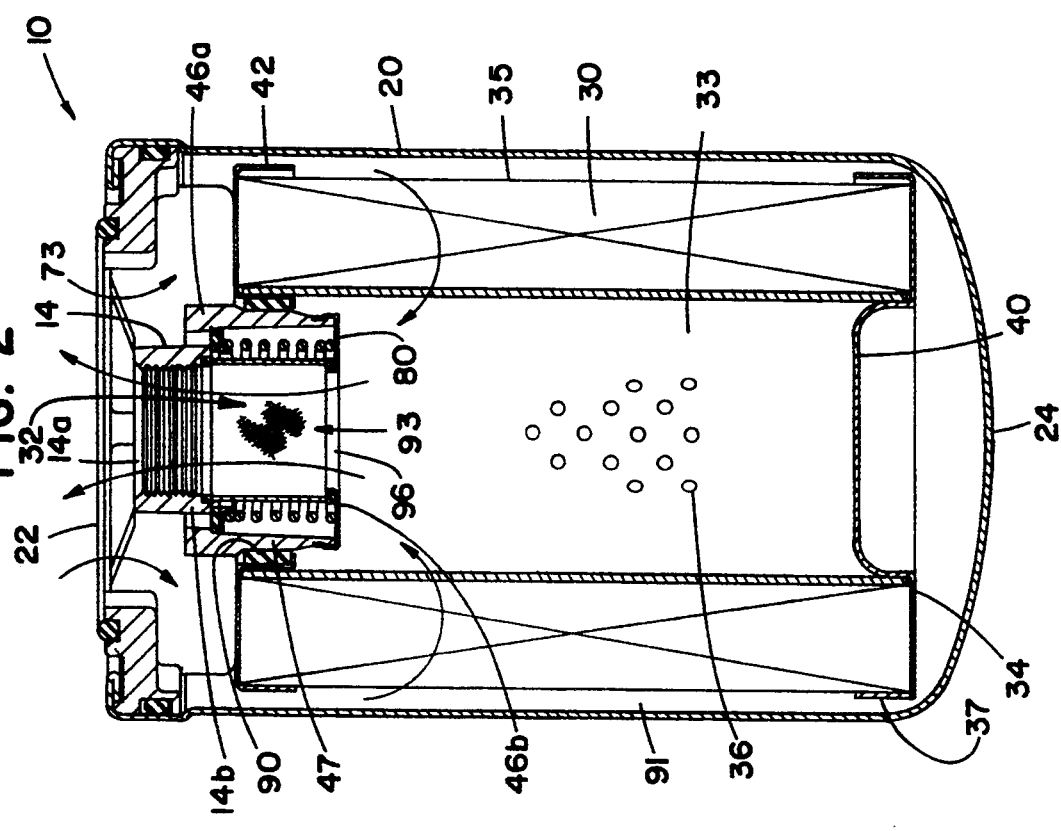

HIGH PRESSURE FILTER WITH INTEGRAL RELIEF VALVE

FIELD OF THE INVENTION

The present invention relates to a fluid filter of the spin-on type capable of high pressure capacity having a by-pass filter associated therewith.

BACKGROUND OF THE INVENTION

Spin-on filters are employed in a variety of applications, including hydraulic systems and engine lubrication systems. Suck filters generally include a filter element with a can or filter housing, having a closed end and an open end. A cover mounts on the open end of the filter housing and, permits attachment of the filter housing to a filter head assembly on any given piece of equipment. Fluid passes from the filter head assembly through a first opening in the filter head assembly into the housing for filtration. A second opening in the filter head assembly receives the filtered fluid from the housing through a second opening in the housing. Various seals typically exist to provide fluid tight seals between the various components. After use, the spin-on filters are typically replaced with new filters.

Although satisfactory in low and medium pressure applications, many conventional spin-on filters are not particularly suitable for use in high pressure applications where pressures may exceed 1000 psi or more. As fluid systems pressures increases, conventional spin-on filters are no longer satisfactory.

Various designs exist Which provide spin-on filters capable of satisfactory performance in the high pressure environment. U.S. Pat. No. 4,369,113, issued to Donaldson Company, Inc. relates to an improved high strength spin-on filter capable of surges and spikes up to 1000 psi or more. U.S. Pat. Nos 4,743,374 and 5,104,537 both issued to Donaldson Company, Inc. relate to filters which provide for improved fatigue and pressure capacity.

Often, the machinery benefits if the high pressure filter provides a by-pass valve to divert the high pressure fluid when the filter element is blocked. As the filter operates, sediment, or particles build up in the filter element, which eventually block fluid flow through the filter element. However, the machinery, which the filter mounts on, continues to provide fluid pressure in a direction towards the filter. Without a by-pass filter, pressure builds up in the filter assembly and may cause serious damage to the machinery.

By-pass filters have been used in low pressure filters. For Example Cudaback U.S. Pat. No. 4,872,976 issued Oct. 10, 1989, discloses a hinged flapper biased against a passage. The flapper rotates from a normal position to a by-pass position. Similarly Brownell U.S. Pat. No. 4,853,118 issued Aug. 1, 1989, discloses a hinged flap disposed against a passage. Each of these designs does not accommodate the high pressures contemplated by the present applications.

By-pass filters, including the filter head assembly, of the prior art provide arrangements in which high pressure fluid flows in an alternative path when the filter element is blocked. However, in the field of high pressure filters the by-pass valve is not integral with the spin-on filter itself. Often the by-pass valve is located in the filter head assembly so that the valve can withstand the high pressures when the by-pass valve was closed. See, for example, Fisher et al. U.S. Pat. No. 4,883,083 issued Nov. 28, 1989 entitled "Relief Valve Assembly; Piston Member From Same and Filteir Head Assembly Incorporating the Same".

Efforts made to include a by-pass filter in the spin-on filter itself centered on placing the by-pass valve at the bottom of the filter housing. However, this arrangement presents serious concerns. During operation sediment builds up in the bottom of the filter housing. When the by-pass valve engages, the fluid flows through the bottom of the filter housing, before returning to the machinery. By drawing the fluid through the bottom of the filter housing, the sediment previously accumulated at the bottom of the filter housing is Carried back into the machinery. The returned sediment causes unnecessary wear on the machinery.

Also, placing the by-pass filter at the bottom of the filter housing forces the fluid to travel the full length of the filter. Fluid flowing the entire length of the filter housing creates unnecessary inefficiencies. For example, see the McBroom et al. reference, U.S. Pat. No. 4,428,834, issued Jan. 31, 1984 to Donaldson Company, Inc. entitled "Fluid Filter With Integral Viscous Damper". The present invention solves these and other problems by providing a unique by-pass arrangement.

SUMMARY OF THE INVENTION

The present invention relates to a spin-on filter of the the used in high pressure fluid applications. The filter includes a housing with an open end and a closed end. A filter element with an open end and a closed end is disposed within the housing. A cover engages the open end of the housing. The cover includes a hub with a first end a second end, the second end of the hub extends into the open end of the filter element. The cover further includes an entrance flow passage operable to deliver fluid to the filter element, and the hub includes an exit flow passage therethrough operable in delivering fluid from the filter element. The entrance and exit flow passages each have associated pressures.

The spin-on filter further comprises a valve assembly extending from the second end of the hub, with the exit flow passage extending therethrough. The valve assembly sealingly engages the open end of the filter element. The valve assembly is constructed and arranged to define a valve seat. A relief channel passes through the valve seat and connects the entrance and exit flow passages. A baffle plate is biased against the valve seat to seal the relief channel during operation, and to open the relief channel when the pressure in the entrance flow passage exceeds the pressure in the exit flow passage by a predetermined amount. A bypass filter is also included. The bypass filter is disposed between the exit flow passage and the relief channel to filter fluid passing through the relief channel.

BRIEF DESCRIPTION OF THE DRAWINGS

FIG. 2 is a cross-sectional side view of the filter shown in FIG. 1 taken along line 2—2 with the by-pass filter closed.

FIG. 3 is a cross-sectional side view of the filter shown in FIG. 1 taken along line 2—2 with the by-pass filter open.

BRIEF DESCRIPTION OF THE PREFERRED EMBODIMENT

Figure 1:
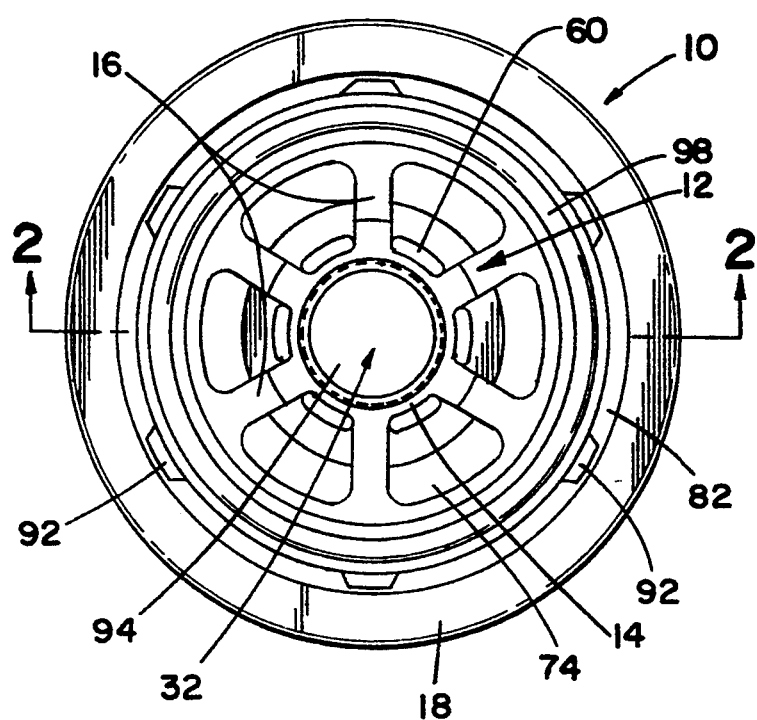
FIG. 1 is a top, plan view of the spin-on filter of the present invention.

Referring now to FIGS. 1–3 there is shown an embodiment of an improved high pressure hydraulic spin-on filter 10 for filtration of fluid or liquids such as oil, as used for example in hydraulic systems. Filter 10 comprises a generally tubular filter housing 20 having an open end 22 and a closed end 24. Filter housing 20 is of generally thin-walled construction and is typically formed from a metal such as steel or other suitable material.

As best shown in FIG. 2, a hollow tubular pleated filter element 30 having a cylindrical shape is located inside the filter housing 20. Filter element 30 includes a perforated liner 36 located on an inner surface 33 of filter element 30. Filter element 30 includes an open end 32 formed by annular end cap 42. Filter element 30 also includes a closed end 34 formed by an annular end cap 37 and bottom member 40. Filter element 30 surrounds perforated liner 36 and forms exterior surface 35.

Open end 32 is closed by a valve assembly 46, and by an O-ring 90. O-ring 90 is compressed between valve assembly 46 and filter element 30. Further, O-ring 90 sealingly engages valve assembly 46 with open end 32 so that fluid exiting filter element 30 must pass through an exit flow passage 93 associated with valve assembly 46.

An annular cavity 91 is formed between filter element 30 and filter housing 20. Fluid is filtered by entering annular cavity 91, passing through filter element 30, through perforated liner 36, and exiting the filter through exit flow passage 93 in the valve assembly 46.

Filter 10 includes a cover 12 disposed within open end 22 of filter housing 20. Cover 12 includes a cylindrical rim member 18. Cover 12 mounts to housing 20 at rim 18. A portion 26 of filter housing 20 adjacent open end 22 is folded inward over an outer periphery of a top surface 82 of rim member 18. A first groove 26a formed in the top surface of rim 18 receives folded portion 26. In the preferred embodiment, the folded portion 26 includes multiple folds.

A plurality of equally spaced radial projections 92 provided in top surface 82 adjacent the outer periphery of rim 18 prevent rotation of the cover 12 relative to the filter housing 20. Radial projections 92 do not extend beyond the outer periphery of rim 18. Folded portion 26 of filter housing 20 deforms slightly against radial projections 92 to prevent rotation of the cover 12 relative to fluid housing 20.

A second groove 97a formed on the outside periphery of rim 18 receives a second O-ring 97. O-ring 97 operates to sealingly engage rim 18 with filter housing 20.

A plurality of ribs 16 interconnect a hub 14 to outer rim member 18 on cover 12. Ribs 16 cooperate with outer rim 18 and hub 14 to form a plurality of annularly spaced openings 74 between hub 14 and rim 18. In the preferred embodiment fluid flows into an entrance flow passage 73, by passing through spaced openings 74, into annular cavity 91, through filter element 301 through perforated core 36 and out exit flow passage 93.

Cover 12 includes cylindrical hub 14 having an axial bore 94 extending therethrough. Annular openings 74 are concentrically positioned about axial bore 94 between ribs 16.

Hub 14 includes a first end 14a and a second end 14b. Second end 14b of hub 14 extends into housing 20.

Beginning at first end 14a of hub 14 and extending to second end 14b of hub 14 are a plurality of threads 59. Threads 59 are located within axial bore 94 and operate to connect spin-on filter 10 to a filter assembly of a piece of machinery (not shown). Axial cavity 94 of hub 14 has an associated diameter.

Cover 12 further includes valve assembly 46. Valve assembly 46 generally comprises a cylinder 47 having an axial bore 96 with a diameter greater than that of hub 14. Valve assembly 46 includes a first end 46a and a second end 46b. Positioned adjacent the first end 46a of valve assembly 46 is a flange 49, which projects perpendicularly toward the axis of valve assembly 46. Valve assembly 46 mounts to the second end 14b of hub 14 at flange 49 of valve assembly 46, as shown in FIGS. 2 and 3. Flange 49 and hub 14 define an annular valve seat 48.

Axial bore 96 of valve assembly 46 extends colinearly from axial bore 94 of hub 14 to define exit flow passage 93. Exit flow passage 93 operates to return filtered fluid back to the machinery (not shown). Flange 49 of valve assembly 46 includes a plurality of relief channels 60. Relief channels 60 fluidly connect exit flow passage 93 to entrance flow passage 73 at annular spaced openings 74. It should be understood that relief channels 60, through flange 49, may be positioned in alternative locations, such as, for example, Flange 49 could project outwardly from valve assembly 46.

An annular baffle plate 62 is positioned adjacent valve seat 48 of valve assembly 46. Baffle plate 62 preferably has an outer diameter slightly less than axial bore 96 of valve assembly 46 and slightly greater than axial bore 94 of hub 14. Baffle plate 62 when placed on valve seat 48 operates to seal relief channels 60. When baffle plate 62 seals relief channels 60, incoming fluid flows into entrance flow passage 73 through filter element 30 and out exit flow passage 93. Baffle plate 62 moves linearly or axially away from valve seat 48 to a by-pass position. The linear or axial movement of baffle plate 62 provides a durable and reliable mechanism in the high pressure environment in which the filter operates.

An annular spring retainer 80 mounts to the second end 46b of valve assembly 46. In the preferred embodiment, annular spring retainer 80 folds into a groove located on the outer surface of valve assembly 46. Annular retainer 80 has an inner diameter substantially equal to the inner diameter of axial bore 94 of hub 14.

Spring retainer 80 retains an end of a coil spring 83. Coil spring 83 is placed between baffle plate 62 and spring retainer 80. Coil spring 83 biases baffle plate 62 against valve seat 48 as to seal relief channels 60. Accordingly, in the preferred embodiment, coil spring 83 is compressed as to properly seal relief channels 60. Further, in the preferred embodiment, coil spring 83, spring retainer 80, hub 14 and valve assembly 46 are all made of a metal such as steel.

In the preferred embodiment baffle plate 62 is planar and defines a perpendicular line therethrough. Baffle plate 62 disengages valve seat 48 and moves axially along its perpendicular line. Because baffle plate 62 moves axially towards spring retainer 80 the forces associated in the present high pressure application are directed towards spring retainer 80. Spring retainer 80 is constructed from a material, preferably steel, strong enough to withstand the high forces exerted on the baffle plate when a by-pass situation occurs.

A filter is provided between exit flow passage 93 and relief channels 60. In the preferred embodiment the filter comprises a cylindrical screen 95 concentric within coil spring 82. Cylindrical screen 95 is retained at one end by spring retainer 80. Spring retainer 80 includes an inner lip 81 to hold cylindrical screen filter 95 in place at its bottom end. The top end of cylindrical screen 95 mounts to hub 14. This arrangement keeps cylindrical screen 95 from shifting or moving when the relief channels are not sealed by baffle plate 62. Screen 95 has generally the same diameter as axial bore 94 of hub 14 and is coaxial therewith.

Fluid does not pass through cylindrical screen filter 95 during normal operation. However, when baffle plate 62 moves to its by-pass position, as shown in FIG. 3, so that fluid flowing from entrance flow passage 73 can pass through cylindrical screen filter 95 and out exit flow passage 93.

In operation entrance flow passage 73 and exit flow passage 93 each have associated pressures. If filter 10 has not been changed after long periods of use, or if sediment blocks portions Of filter element 30 the pressures associated with entrance flow passage 73 increases relative to exit flow passage 93. The increase in fluid pressure located in the entrance flow passage 73 is directly communicated to annular baffle plate 62 through relief channels 60. At a predetermined pressure value, coil spring 83 compresses and baffle plate 62 lifts from valve seat 48 to open relief channels 60. In the preferred application, on a Clark Forklift, if the pressure in the entrance flow passage exceeds a 50 psid, the coil spring will be compressed to open relief channels 60. In this position fluid will flow directly from entrance flow passage 73 to exit flow passage 93 bypassing filter element 30. The bypassed fluid must pass through cylindrical screen 95.

If the fluid did not by-pass filter element 30, pressures in the machinery increase and severe damage might occur. The location of the by-pass filter in the top of filter housing 20 proves to be particularly advantageous. As filter 20 operates, sediment accumulates in the closed end 24 of housing 20. Positioning by-passing filter element 30 at the top of the filter 10, avoids disturbing accumulated sediment when high pressure fluid by-passes filter element 30.

It is to be understood that even though numerous characteristics and advantages of the invention have been set forth in the foregoing description, together with details of the structure and function of the invention, the disclosure is illustrative only and changes may be made in detail, and especially in matters of shape, size and arrangement of parts, wherein the principles of the invention to the full extent indicated by the broad general meaning of the terms in which the appended claims are expressed.

I claim:

1. A spin-on filter for high pressure fluid applications comprising:
    a housing having an open end and a closed end, and a tubular filter element disposed therein, said filter element having an open end and a closed end, a cover engaged with said open end of said housing, said cover including a hub extending therefrom, said hub including a first end facing exteriorly of said housing and a second end facing interiorly of said housing, said cover having an entrance flow passage operable in delivering fluid to an external surface of said filter element and said hub having an exit flow passage operable in delivering filtered fluid from within said filter element, said flow passages having respective pressures;
    a valve assembly extending from said hub into said filter element, to sealingly engage said open end of said filter element, said exit flow passage extending therethrough, said valve assembly being constructed and arranged to define an annular valve seat having a relief channel therethrough connecting said entrance and exit flow passages;
    a baffle plate positioned adjacent to said valve seat, said baffle plate movable between a first position closing said relief channel and a second position displaced therefrom which permits fluid to pass through said relief channel;
    means for biasing said baffle plate against said valve seat so that when said pressure in said entrance flow passage exceeds said pressure in said exit flow passage by a predetermined amount said baffle plate is displaced from said valve seat; and
    a bypass filter disposed between said relief channel and said exit flow passage, so that when said baffle plate is in said second position fluid passing through said relief channel passes through said bypass filter.

2. A spin-on filter as in claim 1 wherein said means for biasing said baffle plate against said valve seat comprises an annular spring having a first end and a second end; said first end coupled to said%baffle plate and said second end coupled to an annular spring retainer mounted to said valve assembly.

3. A spin-on filter as in claim 2 wherein said by-pass filter comprises a cylindrical screen positioned between said second end of said hub and said annular spring retainer.

4. A spin-on filter as in claim 1 wherein said relief channel comprises a plurality of annularly spaced openings.

5. A spin-on filter as in claim 1 wherein said baffle plate is an annular ring.

6. A spin-on filter for use in high pressure fluid applications comprising: a generally cylindrical housing with an open end and a closed end, a rigid cover disposed in said open end of said housing, said cover being of unitary construction including a hub having a first end and a second end, said second end of said hub extending into said housing and having an axial bore defining a exit flow passage extending therethrough, said exit flow passage having an associated diameter, said first end of said hub being connected to a circular rim of said cover by a plurality of radial ribs connected between said hub and said rim defining a entrance flow passage between at least two of said plurality of ribs, said entrance and exit flow passages having associated pressures; said open end of said housing surrounding and being folded to interconnect said cover to said housing;
    an annular valve assembly extending from said second end of said hub into said housing having an axial bore extending therethrough, said axial bore having an associated diameter greater than said diameter of said hub, said valve assembly further including a first end proximate said second end of said hub, and a second end, said valve assembly being constructed and arranged to define with said hub an annular valve seat therebetween at said first end of said valve assembly and a relief channel through said Valve seat connecting said entrance flow passage and said exit flow passage;
    a generally cylindrical filter element disposed within said housing, to define an annular chamber around said filter element in fluid communication with said entrance flow passage; said filter element having an opened and a closed end, said valve assembly extending into and sealing said open end of said filter element;

an annular retainer mounted at said second end of said valve assembly;

an annular baffle plate adjacent said valve seat and said relief channel moveable between a first position closing said relief channel and a second position displaced therefrom;

a coil spring disposed between said annular retainer and said baffle plate, biasing said baffle plate against said valve seat so that when said pressure in said entrance flow passage exceeds said pressure in said exit flow passage by a predetermined amount said coil spring is compressed to displace said baffle plate from said valve Seat to open said relief channel; and a bypass filter disposed:, within said valve assembly between said relief channel and said exit flow passage, so that when said baffle plate is in said Second position fluid passes through said relief channel and said bypass filter.

7. A spin-on filter as in claim 6 wherein said bypass filter comprises an annular screen extending from said second end of said hub to said annular retainer.

8. A spin-on filter for high pressure fluid applications comprising: a housing having an open end and a closed end, and a tubular filter element disposed therein, said filter element having an open end and a closed end, a cover engaged with said open end of said housing, said cover including a hub extending therefrom, said cover having an entrance flow passage operable in delivering fluid to and external surface of said filter element and said hub having an exit flow passage operable in delivering filtered fluid from Within said filter element, said flow passages having respective pressures;

a valve assembly extending from said hub into said filter element, to sealingly engage said open end of said filter element, said exit flow passage extending therethrough, said valve assembly being constructed and arranged to define a valve seat having a relief channel therethrough connecting said entrance and exit flow passages;.

a baffle plate linearly movable between a first position against said valve seat and a second position axially away from said valve seat;

means for biasing filter said filter plate against said valve seat so that when said pressure in said entrance flow passage exceeds said pressure in Said exit flow passage by a predetermined amount, said baffle plate linearly moves from said first position to said second position and fluid passes through said relief channel; and a by-pass filter disposed between said relief channel and said exit flow passage, so that fluid passing through said relief channel passes through said by-pass filter.

* * * * *